United States Patent

[11] 3,572,481

[72] Inventor Rolf Moritz
Wilhelmshaven, Germany
[21] Appl. No. 863,165
[22] Filed Oct. 2, 1969
[45] Patented Mar. 30, 1971
[73] Assignee Olympia Werke A G
Wilhelmshaven, Germany
[32] Priority Oct. 11, 1968
[33] Germany
[31] P 18 02 486.7

[54] LATCH-RELEASED COIL CLUTCH WITH AUTOMATIC FRICTION BRAKE
10 Claims, 4 Drawing Figs.

[52] U.S. Cl. .................................................. 192/12,
192/26, 192/81, 188/135
[51] Int. Cl. .................................................. F16d 67/02
[50] Field of Search .......................................... 192/12 (B-A), 17 (D)

[56] References Cited
UNITED STATES PATENTS

| | | | |
|---|---|---|---|
| 3,186,530 | 6/1965 | Petroff | 192/12BA |
| 3,373,851 | 3/1968 | Baer | 192/12BA |
| 3,434,576 | 3/1969 | Blodgett | 192/12BA |
| 3,521,730 | 7/1970 | Weatherby | 192/12BA |

Primary Examiner—Benjamin W. Wyche
Attorney—Michael S. Striker

ABSTRACT: An output shaft is driven from a drive shaft by clutch means including a coil spring enveloping clutch drums on the drive shaft and output shaft. The ends of the coil spring are connected with a brake disc mounted on the output shaft, and with a control disc mounted on the drive shaft for rotation. When the control disc is stopped, the brake disc continues to rotate and spreads the coil spring so that the clutch is disengaged, while cam means on the control disc move the still turning brake disc to a braking position abutting a stationary brake member.

Patented March 30, 1971

INVENTOR
ROLF MORITZ

BY
Michael J. Striker
ATTORNEY

INVENTOR
ROLF HORITZ
BY
ATTORNEY 3,572,481

1

LATCH-RELEASED COIL CLUTCH WITH AUTOMATIC FRICTION BRAKE

BACKGROUND OF THE INVENTION

The present invention is concerned with an intermittently operating drive, particularly a drive for setting a type carrier in a typewriter or printer.

A clutch drive using a coil spring enveloping two clutch drums is known, whose output shaft can be braked only if the direction of rotation of the drive means is reversed. The braking of the output means is obtained by deliberate operation, and is not automatically accomplished. Therefore, apparatus of the prior art is not suitable for very fast control operations resulting in stopping of the output means after turning a very small angle.

SUMMARY OF THE INVENTION

It is one object of the invention to overcome the disadvantages of braked clutch drives according to the prior art, and to provide a clutch drive with an automatic brake.

Another object of the invention is to provide a clutch drive whose output means is automatically braked when the clutch is disengaged.

Another object of the invention is to provide an intermittent drive with an automatic adjustable brake having sufficiently great brake surface to obtain a fast and effective reaction of the brake even at high operational speeds.

Another object of the invention is to provide a clutch drive with automatic brake by which a type carrier can be exactly positioned.

With these objects in view, the present invention concerns a clutch drive in which inertia movement of a brake means is used for braking the output means to a stop when a clutch connecting the drive means with the output means is disengaged.

One embodiment of the invention comprises brake means connected with rotary output means for rotation with the same and coaxial movement relative to the same between an inoperative and a braking position; rotary control means including actuating means, such as a cam, for moving the brake means from the inoperative position to the braking position during angular movement of the brake means relative to the rotary control means from a normal angular position to an operative angular position; rotary drive means rotatable in one direction and including an input clutch member adjacent an output clutch member of the output means; a coil spring enveloping the input and output clutch members; and stop means for stopping the control means in at least one selected angular position.

The coil spring has one end connected with the brake means and output means for rotation therewith, and preferably secured to the brake means, while the other end is secured to the control means. During rotation of the drive means in one direction, the coil spring is contracted and connects the input and output clutch members with the control means, and the drive means with the output means.

When the stop means stops the control means, the brake means and output means continue to rotate due to inertia so that the brake means turns to the operative angular position and the coil spring is circumferentially spread. Due to the spreading of the coil spring, the input and output means are disconnected. At the same time, the actuating means, such as a cam on the control means, moves the brake means to the braking position during inertial turning of the brake means to the operative angular position. Preferably, one end of the coil spring is secured to the brake means and the other end secured to the control means, so that the coil spring tends to hold the brake means in the normal angular position, and also in the inoperative position while the clutch is engaged.

Instead of cam means, the actuating means of the control means may be threads cooperating with the threads on the brake means.

2

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figures 1, 2:
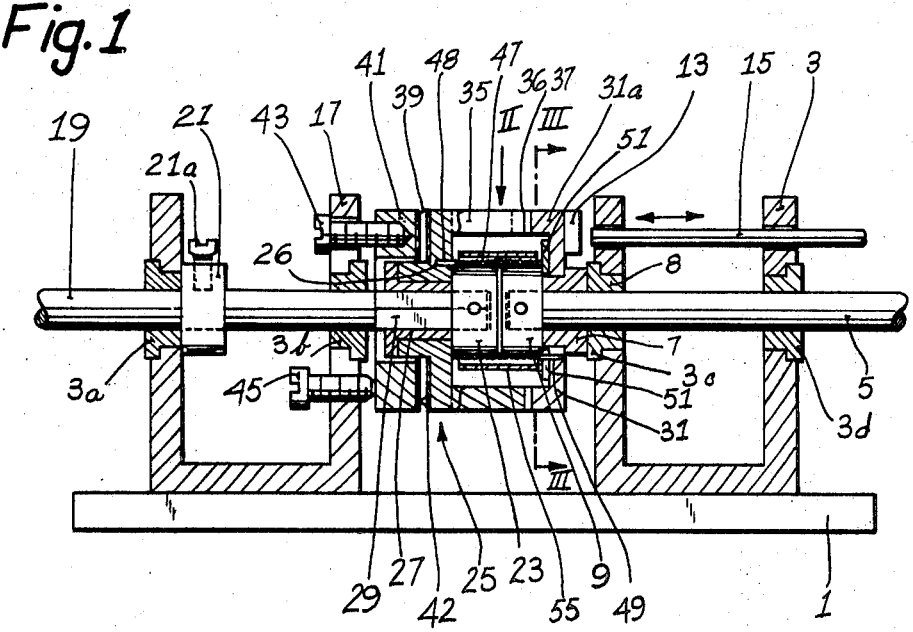
FIG. 1 is a fragmentary, partially sectional view, illustrating an embodiment of the invention.
FIG. 2 is a fragmentary plan view taken in the direction of the arrow II in FIG. 1, but being drawn to a larger scale.
Figure 3:
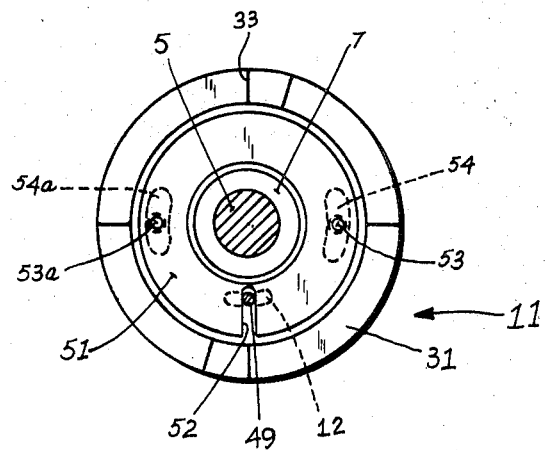
FIG. 3 is a fragmentary sectional view taken along line III—III in FIG. 1.

Referring first to FIGS. 1, 2 and 3, supporting brackets 3 on a base plate 1 have bearings 3a and 3b for supporting an output shaft 19, and bearings 3c and 3d for supporting an input drive shaft 5. Shafts 5 and 19 are coaxial and have adjacent inner ends to which clutch drums 9 and 23 are fixedly secured. Clutch drums 9 and 23 are enveloped by a coil spring 47.

Control means 11 includes a control disc 31 with a lateral flange 31a provided with two or more cams lugs 33 on one side, and with a projecting portion 13 on the other side, as best seen in FIG. 2. During rotation of control disc 31, projection 13 moves along a circular path, and a stop pin 15, mounted on brackets 3, can be shifted to a position 15a located in the path of movement of projection 13 for stopping rotation of control means 11. Control means 11 further includes a bushing 7 spacing clutch drum 9 from bearing 8, and being secured to control disc 31. A holding disc 51 is secured by screws 53 and 53a to control disc 31.

A ring 21 is clamped by screws 21a to output shaft 15 so that axial displacement of the same to the left as viewed in FIG. 2 is not possible. An annular brake member 41 provided with a brake lining 42, is secured by three screws 43 to a bracket 3, and the angular position of the brake member 41 can be adjusted by three screws 45 threaded into bores of bracket 3 and abutting brake member 41.

The movable brake means 25 includes a lining 39, a hub 25a and a bushing 27 connected to the hub and having an inner prismatic, for example, hexagonal, surface slidably mounted on a matching prismatic, for example, hexagonal, portion 29 of output shaft 19. Two diametrically arranged arms 35 are part of brake means 25 and have steel inserts 37 cooperating with two diametrically arranged cam means 33 of control means 11 forming two depressed cam portions. Brake means 25 consists of a light metal to reduce its mass and inertia. Since insert 37 cooperates with cams 33, it is made of steel or any other hard wear-resistant material. Due to the fact that the prismatic output shaft portion 29 matches the inner surface of brake means 25, the same is connected with output means 19, 23 for rotation, but is axially movable on the same between the inoperative position illustrated in FIG. 1, and a braking position in which the lining 41 abuts lining 42. The distance between the linings in the inoperative position of brake means 25, corresponds to the height of the cam lugs 33.

As explained above, a coil spring 47 surrounds the input clutch drum 9 and the output clutch drum 23. One end 48 of coil spring 47 is inserted into a bore 48 in brake means 25, while the other end 49 passes through a radial slot 52 in holding disc 51, and through a part-circular slot 12 in control disc 31, as best seen in FIG. 3. By adjusting the angular position of holding disc 51 relative to control disc 31, while the spring end 49 moves in slot 12, the tension of coil spring 47 is adjusted, whereupon screws 53 and 53a, which pass through part-circular slots 54 and 54a into threaded bores in holding disc 51, are tightened so that the relative angular position between the ends 48 and 49, and consequently between control means 11 and brake means 25 is determined. In this tensioned condition of spring 47, the same abuts the peripheral surfaces of input drum 9 and output drum 23 and connects output shaft 19 with input shaft 5.

During operation, input shaft 5 of the drive means is rotated in one direction, and the tensioned and contracted coil spring 47 connects clutch drum 9 with clutch drum 23 so that the output shaft 19 is rotated in the same direction and at the same speed. Control means 11 and brake means 25 are in the angular position shown in FIG. 2 in which cams 33 are not operative so that coil spring 47 holds brake means 25 in the inoperative position illustrated in FIG. 1, spaced from the stationary brake member 41. Spring 47 is pretensioned by previous adjustment of holding disc 51 by means of screws 53 and 53a and the direction of rotation of drive shaft 5 is selected in view of the winding direction of coil spring 47 to cause a tightening and contracting of coil spring 47. Plurality of bores 48 is arranged in a circle in brake means 25, so that it is possible to secure the spring end portion 48 to brake means 25 in different positions for obtaining the best clutching effect.

One or several stop pins 15 are mounted on brackets 3 in a circle having its center in the axis of shaft 5, the number of the stop pins depending on the number of angular positions in which output shaft 19 is to be stopped. When a stop pin 15 is advanced to the blocking position 15a shown in FIG. 2, projecting portion 13 runs against stop pin 15 and rotation of control means 11 is stopped, while output shaft 19 and brake means 25 continue to rotate due to inertia. Brake means 39 turns from the normal angular position relative to control means 11 to an operative angular position while follower 37 moves along the slanted track of cam lug 33 which pushes brake means 25 to the left as viewed in FIGS. 1 and 2 toward brake member 41 and to a braking position in which lining 39 abuts lining 42. Before brake member 25 arrives in the braking position it turns the end 46 of spring 47 so that coil spring 47 is spread since its other end 49 is held by the stopped control means 11. The spread coil spring no longer connects clutch drums 9 and 23 so that the clutch is disengaged, and output shaft 19 is no longer driven by the continuously rotating input shaft 5.

When stop pin 15 is retracted, coil spring 47 contracts and connects input clutch drum 9 and drive shaft 5 with control means 11 so that the same starts to rotate again with drive shaft 5. Since coil spring 47 contracts, it is also longitudinally shortened, and pulls brake means 25 to the right as viewed in the drawing back to the inoperative position shown in FIG. 1, with bushing 27 moving along the prismatic output shaft portion 29 due to the torsional spring force, brake means 25 is also turned from the operative angular position to the inoperative normal angular position in relation to control means 11, and follower 37 assumes the position illustrated in FIG. 2 located in a cam recess between two actuating cam lugs 33.

During this spreading of coil spring 47, caused by angular movement of brake means 25 from the normal position to the operative position relative to control means 11, the first windings of coil spring 47 located in the region of the stopped end 49 of coil spring 47, are most deformed and spread since the clutch connection between clutch drums 9 and 23 is interrupted when the windings of coil spring 47 release input clutch drum 9. In accordance with the invention, a tubular member 55 surrounds coil spring 47 and clutch drums 9, 23, spaced from coil spring 47 in the contracted position of the same. However, when the coil spring is spread, and the diameter of the windings of the coil spring 47 increased, the same abut the inner cylindrical surface of tubular member 55 and are thus all equally spaced from both clutch drums 9 and 23. After a suitable bore 26 for the spring end 48 has been selected during assembly, a fine adjustment of the angular position of spring end portion 48 is obtained by angular displacement of holding disc 51 relative to control disc 31 by screws 53, 53a moving in part-circular slots 54, 54a of control disc 31. In the accurately adjusted angular position of coil spring 47, screws 53 and 53a are tightened.

Since screws 53, 53a are located on an outer accessible lateral face of control means 11, they remain accessible during normal use of the device so that adjustment of coil spring 47 can be easily carried out while the device is mounted in a printer, for example.

Figure 4:
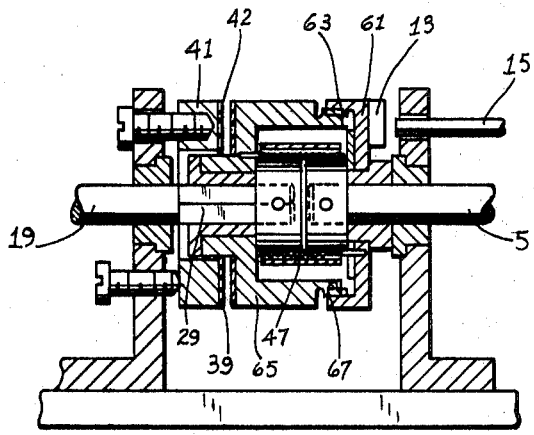
FIG. 4 is a fragmentary sectional view illustrating another embodiment of the invention.

The embodiment illustrated in FIG. 4 corresponds in every respect to the embodiment of FIGS. 1 to 3 except that the actuating means by which the brake means is shifted between the inoperative and operative positions in axial direction of output shaft 19 are not cam means, but threaded means.

The control means 65 has an outer thread 67 whose center is located in the common axis of shafts 5 and 19, and which is in threaded engagement with an inner thread 63 on control disc 61 which has projecting portions 13 cooperating with at least one stop pin 15.

FIG. 4 shows the device in the normal position in which drive shaft 5 is coupled with output shaft 19 by the contracted coil spring 47 whose ends are located in bores of brake means 65 and control means 61. When stop pin 15 is advanced to be located in the circular path of movement of projection 13, control means 61 is stopped, while brake means 65 continues to rotate due to inertia so that due to the cooperation of threads 63, 67, brake means 65 is moved in axial direction on the prismatic portion 65 of output shaft 19 and into the braking position in which lining 39 abuts lining 42 of the stationary brake member 41. When stop pin 15 is retracted, and control means 61 starts to rotate with drive shaft 5, the thread 63 screws thread 67 toward control means 61 so that brake means 65 moves back to the inoperative position as shown in FIG. 4 in which it is spaced from the stationary brake member 41.

In order to obtain the required axial stroke of brake means 65 within the very small angle which brake means 65 is displaced relative to control means 61 during its inertial movement, threads 63, 65 are multiple threads having such a pitch and gradient that self-locking of threads 63 and 67 cannot take place.

The present invention has the advantage that braking of the output shaft is automatically effected when the clutch is disengaged, and that the brake can be combined with the clutch in a very compact unit requiring little space, while a sufficiently large brake lining surface results in a fast and short operation. If operational characteristics of the device are changed during use, the device can be easily adjusted by varying the spring tension by the adjusting means described with reference to FIG. 3 and including the adjusting screws 53 and 53a. The tubular member 55 prevents excess stresses on only a few windings of coil spring 47, and thereby increases the span of useful life of coil spring 57, and of the entire device.

It will be understood that each of the elements described above, or two or more together, may also find a useful application in other types of brake clutch drive differing from the types described above.

While the invention has been illustrated and described as embodied in a clutch drive with an automatic brake operated by inertia upon disengagement of a clutch, it is not intended to be limited to the details shown, since various modifications and structural changes may be made without departing in any way from the spirit of the present invention.

I claim:

1. Clutch drive with automatic brake, comprising rotary output means including an output clutch member; a brake including brake means connected with said rotary output means for rotation with the same and for axial movement relative to the same between an inoperative position and a braking position; rotary control means including actuating means for moving said brake means from said inoperative position to said braking position during angular movement of said brake means relative to said rotary control means from a normal angular position to an operative angular position; rotary drive means rotatable in one direction and including an input clutch member; a coil spring enveloping said input clutch member and said output clutch member and having one end connected with said brake means and output means for rotation therewith and the other end connected with said control means for rotation therewith so that said coil spring contracts, and connects said input and output clutch members with said control means and said drive means with said output means during rotation of said rotary drive means in said one direction; and stop means for stopping said control means in at least one selected angular position while said brake means and output means continue to rotate in said one direction due to inertia so that said brake means turns to said operative angular position and said coil spring is circumferentially spread whereby said input and output members are disconnected, and so that said actuating means moves said brake means to said braking position for stopping said output means.

2. Clutch drive as claimed in claim 1 wherein said brake means includes a cam follower; and wherein said actuating means include axially rising and falling cam means secured to said rotary control means and engaging said cam follower during movement of said brake means from said normal angular to said operative angular position for moving said brake means to said braking position.

3. Clutch drive as claimed in claim 1 wherein said brake means is formed with a thread concentric with the axis of rotation thereof; and wherein said actuating means includes another thread in threaded engagement with said thread during movement of said brake means from said inoperative angular position to said operative angular position for moving said brake means to said braking position.

4. Clutch drive as claimed in claim 1 wherein said one end of said coil spring is secured to said brake means and said other end of said coil spring is secured to said control means so that said coil spring contracts and connects said input and output clutch members during rotation of said drive means in said one direction and holds said brake means in said normal angular position relative to said control means, and also in said inoperative position; and wherein said brake means turning due to inertia to said operative angular position spreads said coil spring.

5. Clutch drive as claimed in claim 4 wherein said drive means and output means include coaxial aligned input and output shafts having adjacent end portions; wherein said input and output clutch members are cylindrical clutch drums secured to said adjacent end portions and having the same diameter; wherein said coil spring is cylindrical and abuts the peripheral surfaces of said clutch drums when contracted, and is radially spaced at least from the peripheral surface of said input clutch drum when spread by said brake means during inertia movement of the same to said operative angular position.

6. Clutch drive as claimed in claim 5 comprising a tubular member having an inner diameter greater than the outer diameter of said contracted coil spring and surrounding the same and said input and output clutch drums so that the spread coil spring abuts the inner surface of said tubular member and has a uniform outer diameter along the length thereof equal to the inner diameter of said tubular member.

7. Clutch drive as claimed in claim 1 wherein said brake means include a stationary brake member engaged by said rotary brake means in said braking position so that said brake means is braked and stopped.

8. Clutch drive as claimed in claim 1 wherein said drive means includes an input shaft; and wherein said control means includes a control disc mounted on said input shaft for free rotation, and having a part-circular slot into which said other end of said coil spring projects, a holding disc having a radial slot through which said other end of said coil spring passes into said part-circular slot, and adjustable means for securing said control disc and said holding disc in adjusted angular positions to each other.

9. Clutch drive as claimed in claim 8 wherein said control disc has a plurality of part-circular adjusting slots concentric with the axis of rotation of said output shaft; wherein said adjustable means include screws having heads located on a lateral accessible face of said control disc, and stems passing through said part-circular adjusting slots and having threaded ends threaded into said holding disc; and wherein said brake means has a plurality of bores for selectively holding said one end of said coil spring.

10. Clutch drive as claimed in claim 1 comprising supporting means supporting said drive means and output means for rotation about one axis; wherein said control means and said brake means are mounted on said input means and output means, respectively for rotation about said axis; wherein said control means has at least one stop projection moving along a circular path; and wherein said stop means includes a stop member mounted on said supporting means for movement between an inoperative position and a stop position in which said stop member is located in the circular path of movement of said stop projection for stopping said control means in said selected angular position.